United States Patent Office 3,492,902
Patented Feb. 3, 1970

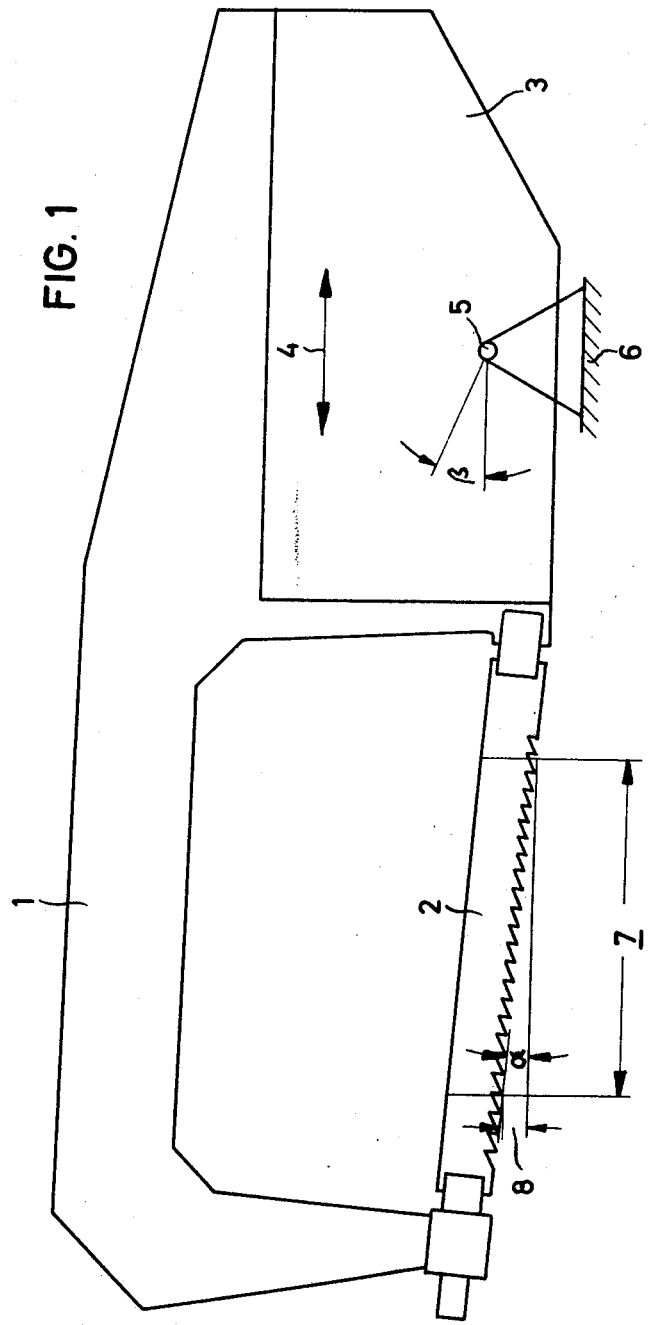

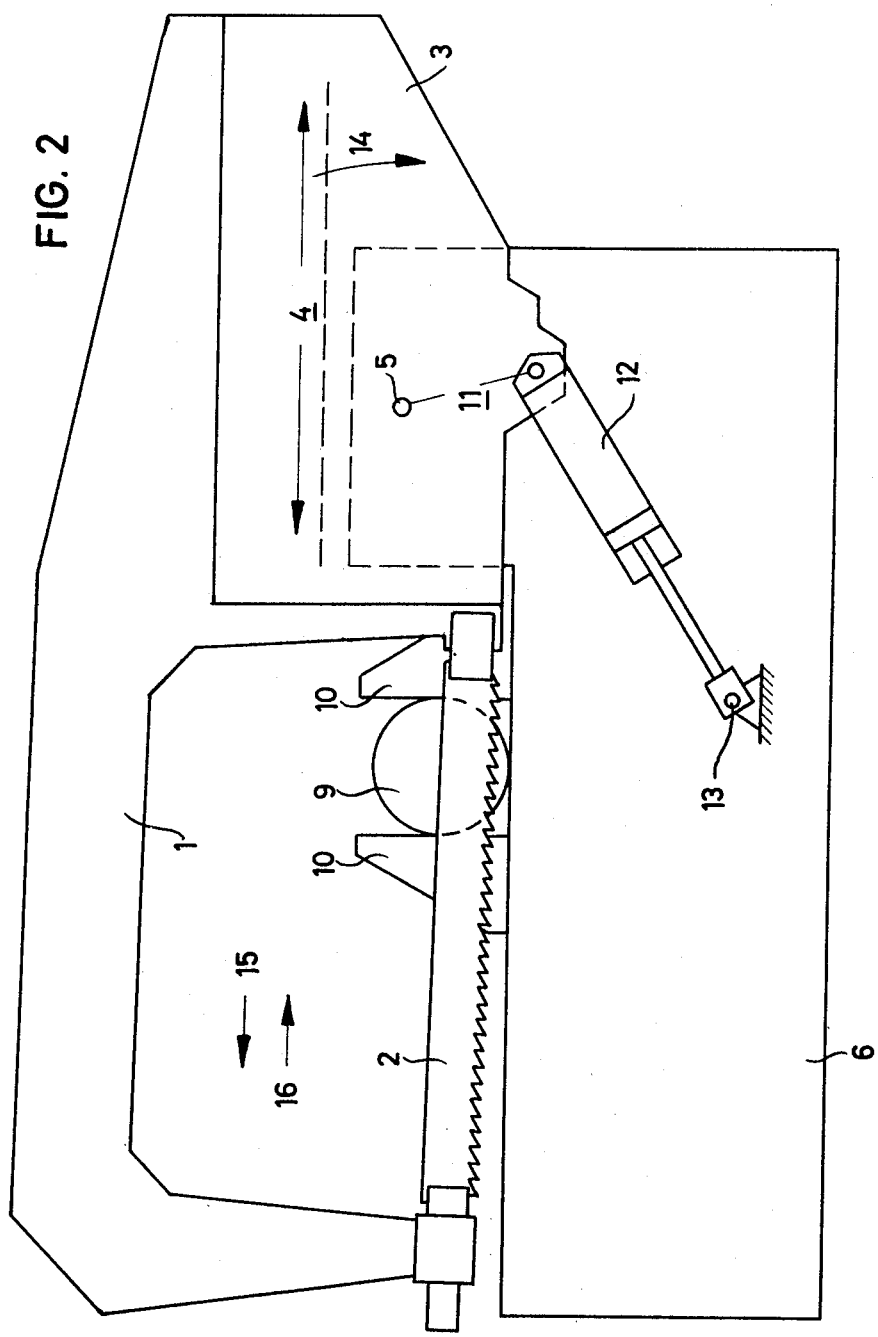

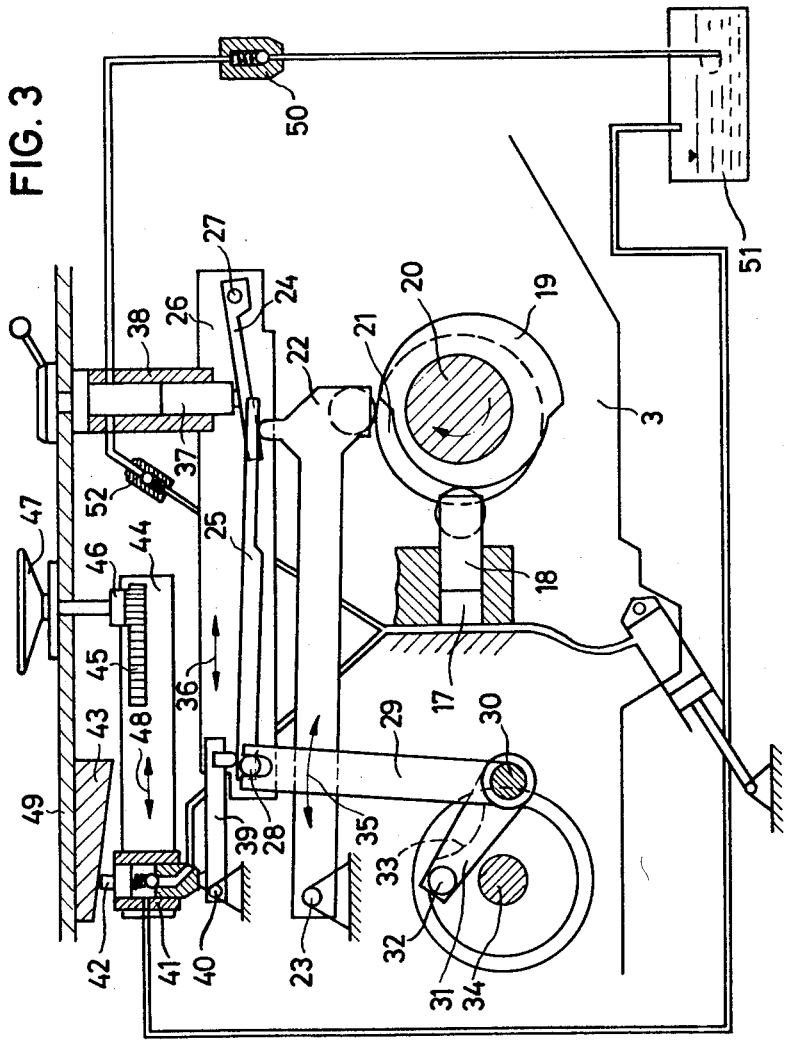

3,492,902
HACK SAW MACHINE
Paul Stolzer, Achern, Baden, Germany, assignor to Karl Stolzer, Maschinenfabrik, Achern, Baden, Germany
Filed Mar. 20, 1968, Ser. No. 714,642
Claims priority, application Germany, Mar. 22, 1967, St 26,658
Int. Cl. B23d 49/04
U.S. Cl. 83—589                                11 Claims

ABSTRACT OF THE DISCLOSURE

A hack saw machine in which the saw blade is inclined at an oblique angle to the direction of its reciprocating strokes and which is provided with a hydraulic mechanism for regulating the pivoting movement of the saw bow and the cutting pressure of the saw blade in accordance with the workpiece to be cut and without requiring the saw blade to be exchanged for cutting workpieces of different cutting resistances and for controlling the lifting and lowering movements of the saw blade at the times of the reversal of the strokes of the blade.

---

The present invention relates to a hack saw machine of the type in which the saw blade is mounted in a saw bow so as to extend at an oblique angle to the direction in which the saw bow is movable by its guide means and in which a hydraulic control mechanism is provided which operates automatically so as to pivot these guide means for the purpose of lifting the saw blade off the workpiece at the end of each cutting stroke, of returning it upon the workpiece at the end of each return stroke, and for producing the required cutting pressure of the saw blade during the cutting strokes.

Such an automatic hydraulic control mechanism for the hack saw machines as heretofore known comprises a double-acting piston which is movable back and forth within a cylinder by means of a cam plate and divides this cylinder into two chambers. When this piston moves in one direction within the cylinder, the hydraulic fluid is drawn from a tank into one of the chambers, while by the movement of the piston in the other direction the fluid which has been drawn into this chamber is expelled through an overflow pipe containing an adjustable throttle valve into the other cylinder chamber. During the following movement of the piston in the opposite direction, the hydraulic fluid coming from the overflow pipe is passed through a further adjustable throttle valve into a conduit which conveys it to the saw blade for cooling the same. The speed of the movements of the piston in both directions is therefore slowed down by the throttle valves to an extent which depends upon the adjustment of these valves. This retarding effect upon the movement of the piston is utilized for lifting the saw blade off the workpiece after it has completed its cutting stroke, for lowering the saw blade upon the workpiece after it has completed its return stroke and for also producing the necessary cutting pressure during the next cutting stroke. This known hack saw machine has the disadvantage that, whenever the cutting speed is changed, it also becomes necessary to readjust the retarding effect of the throttle valves by a new adjustment of these valves in order to insure a proper lifting and lowering of the saw blade and also to produce the most suitable cutting pressure thereof. These necessary adjustments of the throttle valves in accordance with the different cutting speeds of such a hack saw machine are, however, often omitted with the result that breakdowns in the operation of the machine or at least a reduction in output may occur.

According to my United States Patent No. 3,288,008, these disadvantages may be eliminated by providing the machine with suitable means for producing a hydraulic pressure which is adapted to overcome a spring force which normally tends to maintain the saw bow in an upwardly pivoted position in which the saw blade is lifted off the workpiece. This hydraulic pressure will pivot the saw bow at the proper time against this spring force to the particular position in which the saw blade will engage upon the workpiece. This pressure is produced at the moment when the saw bow changes its direction of movement after completing its return stroke by means of an auxiliary mechanism, the operation of which is independent of the cutting speed of the machine.

Although the above-mentioned mechanism prevents any influence of the cutting speed of the machine upon the operations of lifting the saw blade off the workpiece and returning it thereon and also upon the cutting pressure of the saw blade, one deficiency remains, namely, that the rate of the cutting feed of the saw blade which is partly a result of the cutting pressure cannot be controlled at all or only insufficiently.

The highest possible rate of the feed of the saw blade at each cutting stroke thereof into the workpiece is determined in such hack saw machines by the oblique position of the saw blade relative to the direction in which the saw bow is guided during its reciprocating movements, and also by the length of the cutting strokes, that is, by the effective length of the saw blade insofar as it acts upon the workpiece. This maximum rate of feed may, however, be attained only if the predetermined cutting pressure is considerably higher than the cutting resistance of the workpiece. Generally, however, especially when cutting solid material it will be found in actual practice that the cutting pressure which is predetermined by hydraulic means will be smaller than the cutting resistance encountered by the saw blade. For attaining the highest possible cutting output, it is for this reason advisable to mount the saw blade in the saw bow at a greater angle relative to the direction in which it is guided during its reciprocating movements than would be necessary for attaining a maximum feed and to turn the guiding means of the saw bow about a certain angle in the direction opposite to this inclination of the saw blade. The resulting rate of feed in cutting solid material is then determined by the difference between these two angles as seen with reference to the length of the strokes.

In the operation of a hack saw machine which is adjusted in such a manner, two extremes may occur:

(1) In the event that a solid material to be cut is harder than the saw blade, the rate of feed during the cutting stroke of the latter will be zero.

(2) If a material is being cut the cutting resistance of which is considerably lower than the predetermined cutting pressure, for example, a tubular or structural material with a small wall thickness, the rate of feed will be very high and therefore be in accordance with the maximum rate which is attainable at cutting strokes of a certain length by the inclined position of the saw blade relative to the direction in which the saw bow is guided during its reciprocating movements.

In the first case as mentioned above, that is, when the material has a high cutting resistance, the saw bow moves in an arcuate direction, while in the second case the cutting course of the inclined saw blade may extend in a substantially straight direction. The best possible cutting operation and the highest cutting output of such a hack saw machine will, however, be attained if the cutting direction of the strokes of the saw blade is always arcuate.

If the known control means are designed so as substantially to attain the highest possible output especially when cutting a thick solid material, these same control means cannot also serve for attaining the highest possible output when cutting a thin material or one which has a cutting resistance considerably smaller than that of a thick solid material. In such a case it is necessary to replace the normal saw blade by one with fine teeth so as to reduce the rate of cutting feed per tooth. When using fine-tooth saw blades, the total cutting resistance is also higher than that of saw blades with coarse teeth. If the hydraulic cutting pressure is then also made accordingly lower than that applied on thick solid material, an arcuate cutting direction will likewise be attained which nearly attains the best possible results. However, the disadvantage remains that when changing over from cutting a thick solid material to cutting a thin or thin-walled material or vice versa, it is always necessary to exchange the saw blades and also to readjust the cutting pressure.

It is an object of the present invention to provide a control mechanism for a hack saw machine of the type as previously described which permits both thick solid materials as well as thin or thin-walled materials to be cut with an arcuate cutting direction by means of one and the same saw blade and at the highest cutting output which the particular type of material permits.

According to the invention this object is attained by exerting a torque upon the guide means of the saw bow which has the tendency to lift the saw blade off the workpiece, by providing a hydraulic cylinder unit which is pivotably connected to these guide means so as to pivot the same in the direction opposite to the mentioned torque, by providing a control or displacement chamber which is hydraulically connected to the hydraulic cylinder, and by varying the volume of this chamber by means of a displacement piston which is movable within this chamber by being connected by a control element to the driving means of the saw bow.

Contrary to the known types of hack saw machines, the present invention therefore provides that the weight of the saw bow and its guide means does not act upon the saw blade or the workpiece but that the saw bow is acted upon by a torque which tends to lift the saw blade off the workpiece. This may be attained in the most simple manner by mounting the guide means of the saw bow so as to be pivotable about an axis which is located between the center of gravity of the saw bow and its guide means and the saw bow itself so that as long as the guide means are not acted upon by the control means of the machine, the saw bow together with its guide means will always pivot away from the workpiece. This torque is opposed by the action of a hydraulic cylinder which pivots the guide means of the saw bow in such a manner that the saw blade will be applied with a certain cutting pressure upon the workpiece. Although the angle at which the saw blade is inclined relative to the direction of movement of the reciprocating guide means always remains the same, the pivoting movement of the guide means about the combined center of gravity results in a change of the angle of the guide means relative to the workpiece. The cutting feed of the machine according to the invention is effected by a feed pump of a conventional type which operates with a suction valve and a pressure valve and is hydraulically connected to the hydraulic cylinder via the control chamber. After each cutting stroke this feed pump fills the hydraulic cylinder and the control chamber and thereby pivots the guide means of the saw bow and thus the saw bow itself more and more in the direction toward the workpiece.

In order to lift the saw blade off the workpiece during its return stroke and to insure that the cutting direction will have the desired arcuate extent, the invention provides that the amount of hydraulic fluid which is filled into the hydraulic cylinder depends upon the volume of the control chamber which is determined by the movement of the displacement piston therein which, in turn, is controlled by the driving means of the saw bow. The control element which is driven by these driving means so as to act upon the displacement piston is designed according to the invention so as to shift the latter during the return stroke of the saw blade so as to increase the volume of the control chamber so that the hydraulic cylinder can yield under the load of the torque acting upon the guide means of the saw bow and the saw blade will be lifted by this torque off the workpiece. When in its reciprocating movement, the saw blade reaches its point of reversal from the return stroke to the cutting stroke, the displacement piston will, however, be shifted by the control element on the driving means so as to reduce the volume of the control chamber. The hydraulic fluid is then forced out of this chamber and back into the hydraulic cylinder with the result that the guide means of the saw bow will be pivoted and the saw blade will be applied with a suitable cutting pressure upon the workpiece. At the end of the cutting stroke, the same cycle of operations is repeated and the displacement piston is again shifted by the control element on the driving means so as to increase the volume of the control chamber. Of course, the control element should be designed so that at the two points of reversal of the reciprocating movement the change will occur smoothly and at the one point of reversal the volume of the control chamber will only be gradually reduced so that the saw blade will be softly applied upon the workpiece at the start of its cutting stroke. This soft application of the saw blade may be facilitated by elevating it during its return movement so that near the end of this movement it will only be spaced a very short distance from the place to be cut and the guide means of the saw bow only needs to be pivoted very little to rest the saw blade again on the workpiece. This may be attained by making the control element of such a shape that the increase in volume of the control chamber which this element effects by the displacement piston at the forward point of reversal of the movement of the saw blade will be gradually reduced toward the rear reversal point. Thus, the extent of the pivoting movement of the guide means of the saw bow for lifting the saw blade during its return stroke off the workpiece will be gradually reduced from its start toward its end so that in accordance with the inclined position in which the saw blade is clamped in its bow, it will be located directly above the place next to be cut on the workpiece. At the point of reversal from the return stroke to the cutting stroke, the guide means of the saw bow therefore only needs to be pivoted for a very short distance and, by making the control element of a suitable shape, this pivoting movement may be carried out gradually so as to prevent the saw blade from hitting with a hard impact upon the workpiece, although it will be effected very quickly since the saw blade is located immediately above the place to be cut.

Just as important as the soft application of the saw blade upon the workpiece is at the beginning of the cutting stroke is also the control of the cutting feed of the saw blade in relation to the length of the cutting stroke so that this stroke will extend in an arcuate direction. This is attained according to the invention by a similar procedure as during the return stroke, namely, by first reducing the volume of the control chamber considerably at the beginning of the cutting stroke by shifting the displacement piston accordingly so that the guide means of the saw bow will at first be pivoted downwardly with considerable force, and by then gradually reducing this force up to the end of the cutting stroke by shifting the displacement piston more slowly into the control chamber.

The control element between the saw bow and the displacement piston is preferably provided in the form of a cam plate which is mounted on the crankshaft which drives the saw bow. Of course, in place of such a cam plate it is also possible to provide any other suitable control means, for example, a special crank drive or other cam means. It is, however, of advantage to employ such a cam plate because it may be produced and installed very easily and at a low cost. According to another feature of the invention, the same crankshaft for driving the saw bow may also carry another cam plate in the form of an eccentric for operating the feed pump which as such may be of a conventional type.

A hack saw machine which is provided with a hydraulic control mechanism according to the invention eliminates the disadvantages of the known hack saw machines especially insofar as it always produces properly controlled arcuate cutting strokes regardless of the type of material to be cut and also carries out such strokes even though the cutting resistance of the workpiece is lower than the predetermined cutting pressure of the saw blade.

If the same cutting depth is to be attained at each cutting stroke on workpieces of different cross-sectional dimensions, two borderline cases may occur:

(1) The workpiece clamped in the vise of the machine only has the thickness of sheet metal;

(2) The workpiece has a width or thickness which corresponds to the maximum thickness to be clamped by the vise.

Assuming that the rear jaw of the vise is stationary and only the front jaw is adjustable, it is necessary in the first case as mentioned above that the saw blade be lowered during its return stroke to such an extent that at the end of this stroke the front end of the blade will again engage with its first teeth upon the material.

If, however, as in the second case, a very wide or thick material is clamped in the vise and the cutting depth to be attained by each cutting stroke should be the same as in the first case, the lowering movement of the guide means of the saw bow during the return stroke must be reduced in proportion to the difference between the distance of the rear stationary vise jaw from the pivot axis of the guide means to the distance between this axis and the front edge of the wider workpiece or the front jaw of the vise. According to the present invention, this is attained by providing a one-armed intermediate lever between the eccentric cam plate and the piston of the feed pump and by providing suitable means for varying the point of engagement of this eccentric cam plate and/or of the pump piston upon this intermediate lever. Depending upon the location of this point of these points of engagement, the pump piston will reciprocate for a shorter or longer distance and the feed pump will therefore supply a smaller or larger quantity of hydraulic fluid to the hydraulic cylinder and the displacement chamber which is connected thereto. If, for example, the point of engagement of the pump piston with the intermediate lever is located near the bearing of this lever and the point of engagement of the lever with the eccentric cam plate is located at a greater distance from this bearing, the amount of fluid conveyed by the feed pump will be small, while at an engagement of the pump piston with the intermediate lever near the point of engagement of the latter with the eccentric plate or even at a point more remote from the bearing of the lever, the amount of fluid conveyed by the feed pump will be increased. A simple construction for attaining this adjustability may consist in designing the bearing of the intermediate lever so as to be shiftable to different positions while the distance between the eccentric plate and the pump piston remains the same. The intermediate lever may for this purpose be pivotably mounted, for example, on a control arm which may be pivotable or slidable substantially in the direction of the intermediate lever and may be adjusted in accordance with the desired cutting feed. This construction also permits the means for adjusting the movable jaw of the vise to be connected without difficulty to the means for shifting the bearing of the intermediate lever or of the control arm so that the best possible cutting feed will be adjusted automatically in accordance with the thickness of the respective workpiece which is clamped in the vise. The cutting feed may further be combined with the pivoting movement of the guide means of the saw bow which determines the cutting depth of the saw blade into the workpiece. This may be attained by providing a control cam which is mounted in a fixed position on the machine frame and is designed in accordance with the cross-sectional dimensions of the workpiece to be cut. During the pivoting movement of the guide means of the saw bow a connnecting member on the control arm then slides along the curved surface of the control cam and thereby shifts the control arm accordingly which carries the intermediate lever which acts upon the piston of the feed pump.

The hack saw machine according to the invention may, however, also be designed so as to permit the cutting pressure to be varied independently of the size of the cutting feed by inserting a differential cutting-pressure control valve of a type known as such into the hydraulic circuit. For this purpose it is advisable to mount the intermediate lever at one end of a slide member which is movable substantally in the direction of the intermediate lever and carries on its other end a second pivotable lever which is likewise actuated by the eccentric cam plate on the drive shaft. The differential cutting-pressure control valve which is likewise hydraulically connected to the hydraulic cylinder and to the control chamber containing the displacement piston rests on this second lever, while the slide member is slidable by means of the control arm. When the control arm is moved by the control cam which is mounted on the guide means of the saw bow or on the machine frame, and therefore simultaneously with the pivoting movement of these guide means and with the cutting of the saw blade into the workpiece, not only the cutting feed will then be controlled by the adjustable strokes of the piston of the feed pump, but the differential cutting-pressure control valve will also be actuated in such a manner that the highest possible cutting output will also be attained when the material to be cut has a varying cutting resistance. For adjusting the machine so as to operate at such varying cutting pressures, the invention provides an auxiliary lever which is pivotable at one end and interposed between the differential cutting-pressure valve and the second lever as mentioned above. The invention further provides that the differential valve the main piston of which engages upon the auxiliary lever is adjustable to different positions along the length of the auxiliary lever and may be secured in any of these positions, and that the control piston of the differential valve engages upon a stationary cam surface which, when the differential valve is adjusted to a different position relative to the auxiliary lever, shifts the control piston of this valve and thereby varies the amount of hydraulic fluid which may flow through this valve to the hydraulic cylinder and thus produces a cutting pressure of a strength in accordance with the adjustment of the differential valve and its control piston.

The operation of the hydraulic cylinder which effects the cutting feed, the cutting pressure, and the lifting of the saw blade off the workpiece may therefore be controlled by three hydraulic units to which it is connected, namely:

(1) The control or displacement chamber the volume of which is controlled by the movements of the displacement piston which, in turn, are controlled by the position of the saw bow and by the shape of a first cam plate on the main drive shaft which engages upon the displacement piston;

(2) The feed pump which cooperates with a suction valve and a pressure valve and controls the size of the cutting feed per each cutting stroke of the saw blade in accordance with the length of the strokes of the piston of this pump which length, in turn, depends primarily upon the shape of an eccentric cam plate on the main drive shaft which, in the form of a crankshaft, reciprocates the saw bow. The cutting feed may be further affected by an adjustment of the length of the strokes of the piston of the feed pump by translating the reciprocating movements as produced by the eccentric plate by means of an adjustable intermediate lever so as to increase or decrease the length of the piston strokes depending upon the position of the intermediate lever which is pivotably mounted on a slide member which, in turn, is adjusted by a control cam which is designed in accordance with the cross-sectional size of the workpiece to be cut.

3. The cutting pressure may be further predetermined by the adjustment of a differential cutting-pressure control valve of a type known as such which has the additional purpose of hydraulically balancing the weight of the reciprocating elements.

The different control means, namely, the cam plate which acts upon the displacement piston, the eccentric cam plate for operating the feed pump, the stationary cam for adjusting the control piston or the differential cutting-pressure valve, and the control cam for adjusting the cutting feed in accordance with the cross-sectional size of the workpiece may of course be exchangeable for others of different sizes or shapes. However, since each of the first three cam members as mentioned above may be made of one most suitable size or shape for all normal operating conditions and an exchange for others may be advisable only in very rare cases, it is generally only necessary to provide the last-mentioned control cam for controlling the cutting feed in accordance with the thickness of the material to be cut so as to be easily exchangeable. Since the maximum angle within which the guide means of the saw bow is pivotable amounts to 45°, this control cam may be provided in the form of a disk the peripheral surface of which is provided with a plurality of individual cam surfaces which are designed for workpieces of different cross-sectional sizes or shapes. It would thus be possible to provide such a disk, for example, with eight different cam surfaces, for example, for materials of a square cross section and of smaller, medium, and and thicker sizes, cam surfaces for round materials likewise of smaller, medium and thicker sizes, and two additional cam surfaces for pipes and sectional materials of such types as may be more frequently required. Of course, such a cam disk may easily be exchanged for others, for example, with cam surfaces which are most suitable for cutting particular workpieces on a mass-production scale.

The features and advantages of the present invention will become further apparent from the following detailed description thereof which is to be read with reference to the accompanying diagrammatic drawings, in which—

FIGURE 1 shows a diagrammatic side view of a hack saw machine of a conventional type which illustrates the fundamental features thereof;

FIGURE 2 shows a diagrammatic side view of a hack saw machines according to the invention; while FIGURE 3 shows, partly in cross section, a diagrammatic side view of the hydraulic control mechanism for the hack saw machine according to FIGURE 2.

FIGURE 1 illustrates a saw bow 1 of a conventional hack saw machine in which a saw blade 2 is tightly clamped so as to extend at an angle $x$ relative to the direction 4 in which the saw bow 1 is reciprocated by its guide means 3. These guide means 3 are pivotable at an angle B about the axis of a pivot 5 on the machine frame 6. During the reciprocating movements of the saw bow 1 in the direction 4, the saw blade 2 will carry out strokes, for example, of a length 7. Due to the inclination $x$ of saw blade 2, its maximum rate of feed of which is attainable at each cutting stroke amounts to the distance 8.

FIGURE 2 illustrates in the same manner as in FIGURE 1 the saw bow 1 of the hack saw machine according to the invention, in which the guide means 3 of the saw bow are likewise pivotable about the axis 5. The saw blade 2 which is clamped in this saw bow 1 is adapted to cut the workpiece 9 which is clamped between the jaws 10 of a vise. One end of a hydraulic cylinder 12 is pivotably connected to the guide means 3 at a distance 11 from the pivot 5, while the outer end of the piston of this cylinder is pivotable about the axis 13 of a bearing member which is mounted on the machine frame 6. The axis 5 about which the saw bow 1 and its guide means 3 are pivotable is located in such a position that the center of gravity of saw bow 1 and its guide means 3 is located in FIGURE 2 at the right side of the pivot axis 5 so that a torque acts upon the guide means 3 in the direction of the arrow 14. FIGURE 2 further indicates the direction of the cutting strokes of saw blade 2 by the arrow 15 and the direction of the idle or return strokes by the arrow 16.

FIGURE 3 illustrates diagrammatically the control means for operating the hydraulic cylinder 12 of the hack saw machine according to FIGURE 2. These control means comprise a displacement or control chamber 17 which communicates with the hydraulic cylinder 12 and in which a displacement piston 18 is movable so as to vary the volume of chamber 17. The axial movements of piston 18 are controlled by a cam plate 19 which is mounted on a crank shaft 20. This crank shaft 20 which reciprocates the saw bow also carries an eccentric cam plate 21 which engages with a roller on a lever 22 and when turned pivots this lever 22 up and down about the axis of its bearing 23. This lever 22, in turn, presses against the free end of an intermediate lever 24 and also against the free end of another lever 25. The other end of the intermediate lever 24 is pivotably mounted at 27 near one end of a slide member 26, while the other end of lever 25 is pivotably connected to the other end of slide member 26 by a pivot pin 28. This pivot pin 28 is also pivotably and slidably connected to one end of a control arm 29 which, in turn, is pivotable at its other end about a pivot pin 30 which is mounted on the guide means 3. This end of control arm 29 is rigidly secured to or integral with an arm 31 which carries on its free end a roller 32 which is movable along a cam surface 33 on a cam plate. This cam plate may be provided with a plurality of other cam surfaces 33 for different kinds of workpieces and may be turned about a pivot pin 34 on the machine frame so as to place the required cam surface 33 in the proper position in which the cam plate may then be locked to the machine frame, for example, by index pins. If the control arm 29 is pivoted by the cam surface 33 in the directions of the arrows 35, slide member 26 will be shifted accordingly in the directions of the arrows 36.

The intermediate lever 24 engages upon the piston 37 of a feed pump 38 which is connected by a conduit via a suction valve 50 to a tank 51 containing a hydraulic fluid and by another conduit via a check valve 52 to the displacement chamber 17 and to the hydraulic cylinder 12.

Lever 25 is acted upon by another lever 39 which is pivotably mounted at 40 and is, in turn, acted upon by a valve piston which is slidable within the chamber of a differential valve 41 for regulating the cutting-pressure. This piston has an inlet channel which is normally closed by a check valve and connected by a conduit to the control chamber 17 and the hydraulic cylinder 12, while the outlet of the valve chamber of valve 41 leads by a conduit to the tank 51. A control plunger 42 in the valve chamber of valve 41 is in resilient engagement with a stationary cam 43. The differential valve 41 is mounted on a slide member 44 which is movable in the direction of the double-arrow 48 by means of a handwheel 47, a pinion 46 and a rack 45. Cam 43, handwheel 47, and feed pump 38 are mounted on a support 49 which extends at a right angle to the guide means 3.

In the operation of a hack saw machine with forward cutting strokes it is necessary that during each cutting stroke 15 the saw blade 2 will act upon the workpiece 9 with a cutting pressure which depends upon the hardness of its material and its thickness, while during each return stroke the saw blade 2 should be lifted off the workpiece 9 so as to save its teeth. When the saw blade 2 is clamped in the saw bow 1 so as to extend at an angle $x$ (FIGURE 1) to the normal direction 4 of the reciprocating movements of the guide means 3 of the saw bow, the maximum feed attainable at each cutting stroke 15 when the saw bow 1 moves in a straight direction amounts to the distance 8. In place of a straight cutting stroke, it is, however, of greater advantage to operate with an arcuate cutting stroke which is attainable by pivoting the guide means 3 of the saw bow in the clockwise direction (FIGURE 1) about its pivot axis 5 so that the maximum feed 8 will be reduced during the course of each cutting stroke.

For lifting the saw blade 2 off the workpiece 9 and for again returning it thereon, the hydraulic cylinder 12 is provided which also serves for controlling the feed and the cutting pressure of the saw blade. As shown in FIGURE 3, this hydraulic cylinder 12 communicates hydraulically with the control chamber 17, the volume of which is adjustable by shifting the displacement piston 18 therein. Thus, when piston 18 is shifted so as to increase the volume of chamber 17, the torque 14 (FIGURE 2) will be exerted upon the guide means 3 and the saw blade 2 will therefore be lifted off the workpiece 9. If, on the other hand, piston 18 is shifted so as to reduce the volume of chamber 17, a torque in the direction opposite to torque 14 is exerted upon the guide means 3 with the result that the saw blade 2 engages with a corresponding pressure upon the workpiece 9. The reciprocating movements of saw bow 1 are produced by the revolutions of crank shaft 20 on which the cam plate 19 is secured. When cam plate 19 is in the position as shown in FIGURE 3, saw bow 1 is located approximately at the center of its return stroke and the volume of control chamber 17 is then increased by a movement of piston 18 toward the right. At the point of reversal of the movements of the saw blade from the return stroke 16 to the cutting stroke 15, the radius of cam plate 19 is considerably increased by a short intermediate cam portion, as shown at the lower side of cam plate 19 in FIGURE 3, so that piston 18 will be forced into the control chamber 17 and reduce the volume of the latter and supply the amount of hydraulic fluid which has been displaced to the hydraulic cylinder 12. This causes the saw blade 2 to be applied upon the workpiece 9 with a predetermined pressure. At the next point of reversal of the movements of the saw blade from the cutting stroke 15 to the return stroke 16, the radius of cam plate 19 is reduced by another short intermediate cam portion to such an extent that piston 18 in chamber 17 can yield under the pressure of the hydraulic fluid in cylinder 12 which is exerted upon the latter by the torque 14, so that the guide means 3 will be pivoted about the axis 5 in the direction of the torque 14 (FIGURE 2) and the saw blade 2 will be lifted off the workpiece. In order to prevent the saw blade from being lifted excessively off the workpiece after this reversal from the cutting stroke 15 to the return stroke 16, a gradual increase in the radius of cam plate 19 will cause piston 18 to be gradually forced farther into the control chamber 17 so that at the point of reversal from the return stroke 16 to the cutting stroke 15 saw blade 2 will only be spaced at a very short distance from workpiece 9. The radius of cam plate 19 decreases gradually up toward the end of the cutting stroke 15 which has the result that the originally high feed or cutting pressure of the saw blade will gradually decrease and the direction of the cutting stroke will be arcuate.

For starting the next cutting stroke 15, it is necessary to lower the saw blade 2 for a certain distance, i.e. that of the feed 8 (FIGURE 1), by pivoting the guide means 3 of the saw bow for a certain angular distance B in the direction toward the workpiece. This is attained by means of the feed pump 38 which then pumps hydraulic fluid into the hydraulic cylinder 12. Thereafter, the same cycle of operations is repeated, namely, the cutting stroke with a gradually decreasing cutting pressure and then the lifting of the saw blade off the workpiece which is followed by the return stroke 16. Feed pump 38 is for this purpose actuated by the eccentric cam plate 21 via the roller-carrying lever 22 and the intermediate lever 24. The eccentric cam plate 21 is secured on cam shaft 20 like the other cam plate 19 and therefore effects one movement of feed pump 38 in each direction at each revolution of cam shaft 20. This cam plate 21 is mounted on cam shaft 20 in such a position relative to cam plate 19 that the operation of filling the hydraulic cylinder 12 will be completed at the beginning of the return stroke of the saw blade so that feed pump 38 will carry out its suction stroke during the entire return stroke of the saw blade. Therefore, the pressure which is built up continuously in the feed pump 38 during the cutting stroke acts together with the pressure which is produced by the reduction in volume of the control chamber 17 which is caused by the movement therein of piston 18. Of course, it is also possible to control the operation of the feed pump in another manner, namely, by providing in place of the eccentric cam plate 21 one of a different shape which is designed so as to cause a certain volume of hydraulic fluid to be pumped into the hydraulic circuit, for example, after the cutting stroke is completed, and thus to effect the new feed adjustment immediately after the end of the cutting stroke.

Another possibility of controlling the feed of the saw blade consists in mounting the auxiliary lever 24 on a slide member 26 which may be shifted by a control lever 29 in the direction of the arrows 36. If the slide member 26 is shifted, for example, in the direction toward the left of FIGURE 3, the amplitude of the stroke of feed pump 38 will be reduced and a smaller volume of fluid will be filled into the hydraulic circuit and thus into the hydraulic cylinder 12 and the control chamber 17. The reverse occurs when slide member 26 is shifted toward the right and the volume of the fluid filled into the hydraulic circuit and thus also the feed of the saw blade will increase. The adjustability of the feed of the saw blade is utilized for always remaining within the best possible feed range regardless of variations in the cross-sectional dimensions of the workpiece 9 to be cut. This is attained by means of the roller 32 on arm 31 rolling along the cam surface 33 when the guide means 3 of the saw bow are pivoted during the cutting operation. As already mentioned, the cam plate on which the cam surface 33 is provided is rigidly connected to the machine frame 6, while the control lever 29 is pivotably connected at 30 to the guide means 3. When the latter are pivoted at a certain angle B (FIGURE 2), roller 32 on arm 31 will roll along the cam surface 33 and will thereby pivot the control lever 29 toward the left in FIGURE 3 so that slide member 26 will likewise be shifted toward the left and thereby adjust the feed pump 38 to carry out shorter strokes.

The cam surface 33 is illustrated in FIGURE 3 as being in the form of an arcuate projection on a circular plate. This control cam is especially suitable for cutting a thick solid piece of material since the large feed at the beginning of the cutting operation gradually diminishes toward the center of the workpiece and again increases after the saw blade has passed beyond the diameter of the workpiece. Of course, other control cams may also be designed for the best possible feed on workpieces of other shapes. Thus, for workpieces of a considerable crosss-sectional thickness which have a high cutting resistance, the control cam should be designed so as to produce a slower feed, while for workpieces with a lower cutting resistance, it should be designed so as to produce a faster feed.

Slide member 26 also carries the lever 25 which is pivotally mounted thereon at 28. This lever 25 is likewise moved upwardly and downwardly by the roller-carrying lever 22 and transmits this movement to a certain extent to the lever 39 which is pivotally mounted on the bearing 40. The differential valve 41 for controlling the cutting pressure is in longitudinally slidable engagement with the slide member 44 and the plunger 42 of this valve is in resilient engagement with the fixed cam 43. If by a rotation of handwheel 47 slide member 44 is shifted toward the right in FIGURE 3, valve 41 will be likewise shifted in the direction toward the point of engagement of lever 39 with lever 25 with the result that not only the rate of flow of the hydraulic fluid through valve 41 will be varied by the movement of plunger 42, but the stroke will be varied by the movement of plunger 42, but the will also be changed. A larger stroke will also be attained when slide member 26 is shifted by control lever 29 toward the left of FIGURE 3, that is, when due to the shape of the control cam 33 the cutting feed of the saw blade is reduced. By making the levers 25 and 39 of suitable dimensions, it is in this manner possible to attain a perfect hydraulic weight compensation of the reciprocating saw bow.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In a hack saw machine haivng a frame, means on said frame for clamping a workpiece in a fixed position, a saw box, guide means for guiding said saw bow for reciprocating movements in one direction, driving means for reciprocating said saw bow so as to carry out successive cutting and return strokes, means for pivotably mounting said guide means together with said saw bow on said frame so as to be pivotable relative to said workpiece about an axis extending transverse to and spaced from said bow, and means for removably securing a saw blade in said saw bow in a position so as to extend at an oblique angle to said direction of movement of said saw bow so that during said cutting strokes said saw bow blade is pivoted upwardly together with said saw bow and said guide means, wherein the improvement comprises lifting means acting upon said guide means and tending to lift said saw blade at all times off said workpiece, a hydraulic cylinder having a piston slidable therein and together forming a unit, one end of said unit being pivotably connected to said frame and the other end to said guide means in such a position that, when a pressure fluid is injected into said cylinder, said unit will act upon said guide means in the direction opposite to the action of said lifting means, a control chamber conduit means for hydraulically connecting said control chamber to said cylinder, a displacement piston slidable within said control chamber, pump means for conveying a pressure fluid to said control chamber and said cylinder and control means connected to said driving means for acting upon said displacement piston so as to decrease the volume of said control chamber and to force said pressure fluid therefrom into said cylinder during the cutting stroke of said saw blade and to increase said volume during the return stroke of said saw blade and thereby to affect the movements of said cylinder unit so as to lift said saw bow and saw blade off said workpiece at the end of each cutting stroke, due to the tendency of said lifting means and to lower said saw bow by hydraulic force so that said saw blade will engage upon said workpiece at the end of each return stroke, and thereafter to exert a further hydraulic force upon said saw bow so as to attain the desired cutting pressure of said saw blade on said workpiece during each cutting stroke.

2. A hack saw machine as defined in claim 1, wherein said lifting means are at least partly formed by pivotably mounting said guide means so that the center of gravity of said guide means, said saw bow and said saw blade is located in such a position that a torque is produced on said guide means which tends to pivot the same at all times in a clockwise direction so as to lift said saw blade off said workpiece.

3. A hack saw machine as defined in claim 2, wherein said center of gravity of said guide means is located at a point intermediate the common center of gravity of said guide means and saw bow and said saw bow.

4. A hack saw machine as defined in claim 1, wherein said driving means for reciprocating said saw bow comprise a crankshaft, said control means for acting upon said displacement piston comprising a cam plate secured to said crankshaft and acting upon the outer end of said piston.

5. A hack saw machine as defined in claim 4, wherein said pump means comprise a feed pump, and further comprising an eccentric cam plate secured to said crankshaft, and means for transmitting the movements of said cam plate to said feed pump for operating the same.

6. A hack saw machine as defined in claim 5, further comprising a one-armed lever intermediate and engaging with said eccentric cam plate and the movable part of said feed pump for operating the latter by the rotation of said cam plate, means for pivotably mounting said lever at a point spaced from said feed pump and said eccentric cam plate, and means for adjusting the point of engagement of at least one of the elements consisting of said movable part and said eccentric cam plate with said lever in the longitudinal direction of said lever.

7. A hack saw machine as defined in claim 6, wherein said adjusting means comprise a cam member secured in a fixed position to said frame and having at least one cam surface thereon and a two-armed control lever pivotably mounted on said guide means and having one arm connected to the bearing of said intermediate lever for moving the latter substantially in its longitudinal direction, and the other arm of said control lever being adapted to move along said cam surface during the pivoting movement of said guide means.

8. A hack saw machine as defined in claim 6, wherein said adjusting means comprise a slide member movable substantially in the longitudinal direction of said intermediate lever and having said lever pivotably mounted on one end thereof, a second lever pivotably connected to the other end of said slide member and likewise adapted to be pivoted by said eccentric cam plate, a differential cutting-pressure control valve acting upon said second lever and hydraulically connected to said control chamber and said cylinder, a member secured in a fixed position to said frame and having at least one cam surface thereon, and a two-armed control lever pivotably mounted on said guide means and having one arm pivotably connected to said slide member for moving the latter and thus said intermediate lever substantially in its longitudinal direction, and the other arm of said control lever being adapted to move along said cam surface during the pivoting movement of said guide means.

9. A hack saw machine as defined in claim 8, further comprising a third lever, pivotably mounted at one end and interposed between said differential valve and said second lever and a substantially fixed member having an inclined cam surface, said differential valve having one valve piston engaging upon said third lever and another valve piston engaging upon said inclined cam surface, and means for adjusting said differential valve to different fixed positions so that said two valve pistons engage upon different points on said third lever and said inclined cam surface, respectively.

10. A hack saw machine as defined in claim 6, wherein said cam member having at least one cam surface thereon is removably secured to said frame to permit it to be exchanged for another cam member having a different cam surface.

11. A hack saw machine as defined in claim 6, wherein said cam member has a plurality of different cam surfaces thereon and is adapted to be moved to and locked in different positions to said frame in each of which one of said cam surfaces is operatively associated with said other arm of said two-armed lever.

References Cited

UNITED STATES PATENTS

| | | | |
|---|---|---|---|
| 1,665,090 | 4/1928 | Gommel | 83—647 X |
| 2,049,626 | 8/1936 | Rasmussen | 83—647 X |
| 3,288,008 | 11/1966 | Stolzer | 83—647 X |

FRANK T. YOST, Primary Examiner

U.S. Cl. X.R.

83—639, 647